United States Patent Office 2,772,284
Patented Nov. 27, 1956

2,772,284

SOLVENT-SOLUBLE, COMPLEX, PHTHALO-CYANINE-YIELDING COMPOUNDS

George Barnhart, Pencader Hundred, and Benjamin F. Skiles, Brandywine Hundred, Del., assignors to E. I. du Pont de Nemours & Company, Wilmington, Del., a corporation of Delaware No Drawing. Application October 20, 1951,
Serial No. 252,401

4 Claims. (Cl. 260—314.5)

This invention relates to novel, solvent-soluble complex compounds which are capable of yielding phthalocyanine pigments upon treatment with reducing agents or upon heating.

As is well known, the phthalocyanine coloring matters, for instance copper phthalocyanine, nickel phthalocyanine or metal-free phthalocyanine are intensely colored pigments of highly desirable qualities for instance as regards shade, tinctorial strength, heat stability and fastness to light. Ever since their discovery, attempts have been made to produce from them dyestuffs for textile materials. The extreme insolubility of the phthalocyanine pigments both in water and in common organic solvents, for instance alcohols, benzene or chloroform, thwarts the attempt to apply these pigments directly to textile fiber. On the other hand, attempts to convert the phthalocyanine compounds into water-soluble derivatives by inserting proper groups into the aryl nuclei, for instance sulfonic acid groups, mercapto groups, or azo bridges coupled to proper coupling components, have resulted in dyes having the shortcomings of the average organic dyestuff bearing such groups, for instance lack of fastness to bleach, to washing or to crocking.

It is accordingly an object of our invention to produce novel, solvent-soluble, complex compounds which by virtue of containing in their structure an essentially complete phthalocyanine molecule are capable of generating the latter upon the application of a simple treatment such as mild reduction or heating. The effect of such compounds would be that by virtue of their solubility in organic solvents, for instance alcohols, benzene or chloroform, they could be applied to textile fiber by the aid of such solvents, and could then be converted on the fiber into an insoluble phthalocyanine coloring matter by heating or by treatment with reducing agents. Various additional objects and achievements of this invention will appear as the description proceeds.

Now, we have found that by treating phthalonitrile with ammonia and a salt of nickel or copper under conditions more fully set forth hereinbelow, novel, complex, solvent-soluble compounds are obtained which seem to be made up of 6 phthalonitrile units, a bivalent metal atom (i. e. Ni or Cu) and an extra NH group. Considering that the metal-phthalocyanine molecule generally consists of 4 phthalonitrile units joined together to a central bivalent metal atom, it is clear that our novel complex compounds embrace in their structure a molecule of a metal phthalocyanine, plus two extra phthalonitrile units and an extra NH group. Thus, without implying any intention to limit this invention thereby, it is our belief that the novel compounds possess a structure as follows:

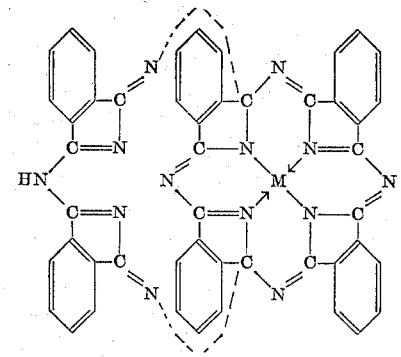

wherein M represents a bivalent metal such as Ni or Cu. It will be noted that these metals are characterized by the common property of forming ammine salts, such as $Cu(NH_3)_2Cl_2$, and that their atomic numbers are contiguous.

In spite of the aforegoing, it is believed that the spatial arrangement of the molecule is not exactly the same as in a metal phthalocyanine. Thus, whereas copper phthalocyanine has been proven by X-ray diffraction patterns and similar investigations to be essentially flat, it is believed that the novel complex molecule of the above type lies in 3 planes joined together at a common axis running through the middle vertical sequence of C—N, N—C atoms in the above formula. When a reducing agent is applied, the "wing" shown on the extreme left breaks off, liberating two phthalonitrile molecules and one molecule of $NH_3$, and the remaining 2 "wings" spring into a single plane forming the molecule of the corresponding metal phthalocyanine. The same transformation takes place also when heat alone is applied, say at temperatures between 120° and 200° C., except that in this case the requisite two H atoms, to convert the NH group into $NH_3$, probably come from any oxidizable organic matter or impurities in the environment.

The above hypothesis concerning composition and spacial configuration is based on careful analysis of the fission products produced upon heating or reducing the complex compounds. It is further supported by the observed fact that whereas the phthalocyanines are intensely colored and produce excellent pigments, the novel complex compounds are barely colored (producing in solution a yellow-brown color) and have by themselves no tinctorial properties whatever. Apparently, the planar structure of the metal phthalocyanines is essential to the intramolecular valence-bond resonance which is generally considered responsible for producing color, and this planar structure is absent in our novel compounds. Furthermore, as already mentioned, the solubility characteristics of our novel complex compounds are sharply distinguished from those of the metal phthalocyanines.

Because of the aforementioned lack of tinctorial properties in the complex intermediates of this invention, and because of the readiness with which they generate a pigment by treatment on the fiber, we find it convenient to refer to our novel compounds as leuco-phthalocyanines, by analogy to the term employed in the vat dye field, it being remembered, however, that whereas a leuco vat compound is a reduction product of the dye, the leucophthalocyanines are in a sense a higher oxidation stage than the corresponding phthalocyanines, inasmuch as they yield the latter upon treatment with reducing agents.

The synthesis of our novel leuco-phthalocyanines is preferably effected by reacting phthalonitrile with anhydrous ammonia and an anhydrous salt of the desired metal, for instance the chloride, bromide or sulfate of copper or nickel, at 60° to 90° C. for ten to forty hours in solvents such as methanol, ethanol or the "Cellosolves" (ethylene glycol monomethyl, monoethyl, or monobutyl ether, etc.) in the presence of methylglucamine or urea. The last-mentioned compounds seem to act as catalysts and need not be employed in more than catalytic quantities (say 1 to 10% by weight of the solvent). The quantity of metal salt obviously should, for complete reaction, be at least equal to theory, that is 1 mole of salt for each 6 moles of phthalonitrile, but it may be much larger. The ammonia is preferably passed into a mixture of the metal salt and solvent until the latter is saturated, whereupon the phthalonitrile and catalyst are added. The order of addition, however, may also be reversed, if desired. Liquid ammonia may be employed if desired.

The reaction may be carried out in an open or sealed vessel. As reaction proceeds, most of the reactants are consumed, producing a yellow-brown to red-brown reaction mass, depending on the concentration of the leuco compound produced. By filtering off any insoluble residues and drowning the filtrate in water, the leuco compound may be isolated and dried at room temperature.

Upon heating, say at temperatures above 100° C., the leuco compound decomposes yielding ammonia vapors, phthalonitrile, and the metal phthalocyanine corresponding to the metal salt employed. The pigment may be separated from the regenerated phthalonitrile, by washing out the later with a suitable solvent, for instance acetone or glycol-monoethyl ether.

The same type of decomposition with generation of pigment is obtained if the leuco compound is treated with an aqueous, alcoholic or aqueous-alcoholic solution (including in these terms alcohol ethers such as the "Cellosolves"), of a reducing agent, with or without warming. As instances of suitable reducing agents for this purpose may be mentioned sodium sulfide, sodium or potassium bisulfite, sodium or potassium sulfite, sodium hydrosulfite, zinc formaldehyde sulfoxylate, stannous chloride, sulfur dioxide, hydriodic acid, ascorbic acid, hydrazine hydrate and hydroxylamine.

Without limiting our invention, the following examples are given to illustrate our preferred mode of operation. Parts mentioned are by weight.

*Example 1.—Complex leuco compound for copper-phthalocyanine*

A mixture of 61.4 parts of anhydrous cupric chloride and 400 parts of glycol-monoethyl ether is treated with gaseous ammonia below 30° C. (water cooling) until heat is no longer liberated. The resulting mixture is then stirred in an atmosphere of ammonia for one hour, at the end of which time 200 parts of phthalonitrile and 12 parts of methyl-glucamine are added. The mass is agitated for twenty hours at 70° C., and filtered hot. The insoluble residue is washed with 1000 parts of hot glycol-monoethyl ether, and the combined filtrate and washings are drowned in 6000 parts of water. The precipitated product is filtered off, washed with water, and dried without heating.

*Example 2.—Same.—Using urea as catalyst*

A mixture of 15 parts of anhydrous cupric chloride and 150 parts of glycol-monoethyl ether is saturated with ammonia gas at room temperature. Fifty parts of phthalonitrile and 3 parts of urea are added and the mass is heated to and stirred at 70° C. for twenty hours. It is then filtered hot, and the insoluble portion is washed with 100 parts of hot glycol-monoethyl ether. The combined filtrate and washings are drowned in 2000 parts of water. The precipitated product is isolated by filtration, washed with water and dried without heating.

*Example 3.—Complex compound for nickel phthalocyanine*

118.8 parts of anhydrous nickel chloride and 800 parts of glycol monoethyl ether are charged into a vessel and treated with a stream of ammonia gas for two hours, the slurry being continually stirred. Next, 400 parts of phthalonitrile and 24 parts of methyl-glucamine are introduced, and the reaction mass is heated to 60° C. and held at that temperature with continued supply of ammonia gas and continued agitation for sixteen hours. The reaction mass is filtered hot, and the filtrate is drowned into 8000 parts of water. The resulting precipitate is filtered off, washed with water, and air dried without heating.

*Example 4.—Complex leuco compound from 4-nitrophthalonitrile*

30.5 parts of anhydrous cupric chloride are slurried in 200 parts of glycol monoethyl ether and treated with ammonia gas until the uptake of ammonia by the copper salt has ceased. 100 parts of 4-nitro-phthalonitrile and 6 parts of methylglucamine are introduced, and the entire mixture is heated at 63° C. for one hour. The charge is then filtered to remove insoluble matter, and the filtrate is drowned into 2000 parts of water. The resulting precipitate is filtered off, washed with water, and air dried without heating.

The following additional examples will illustrate the conversion of our novel complex compounds into pigments both in substance and on the fiber.

*Example 5.—Conversion of complex compound into pigment by heating*

Fifty parts of the complex leuco compound for copper phthalocyanine, prepared as described in Example 1, were heated at 200° C. for fifteen minutes. The blue residue left after heating was crushed under acetone at 30° C., then filtered, washed with acetone and dried. 25.8 parts of copper phthalocyanine were obtained.

*Example 6.—Conversion into pigment by reduction*

(This process is claimed in copending application of B. F. Skiles, Serial No. 252,402)

To 5 parts of the complex leuco compound for copper phthalocyanine, prepared as in Example 1, was added a solution of 3 parts of ascorbic acid in 50 parts of ethylene glycolmonoethyl ether. The mixture was heated to 100° C. and stirred at this temperature for 15 minutes. The deep blue precipitate of copper phthalocyanine which formed was filtered off, washed with acetone, and dried. 2.26 parts of copper phthalocyanine were obtained.

*Example 7.—Dyeing of cotton*

(This process is claimed in copending application of B. F. Skiles, Serial No. 252,402)

The complex leuco compound for nickel phthalocyanine, obtained in Example 3 hereinabove is dissolved in "Cellosolve" (monoethyl ether of ethylene glycol) to form a 10% solution. Cotton piece goods, which have first been swollen by boiling successively in water and in "Cellosolve," are padded with the above solution. The fabric is then dried and boiled for twenty minutes in a 5% aqueous solution of potassium ferrocyanide. The dyeings are finished by boiling for twenty minutes in a 5% lactic acid solution and soaping for twenty minutes at 180° F. in a 0.5% soap solution. Deep green-blue shades of good brightness are obtained. They are very fast to light and to crocking, and they exhibit good fastness to washing, including the application of bleaching agents such as sodium hypochlorite.

Example 8.—Printing of Fabric (This process is claimed in copending application of C. F. Miller, Serial No. 252,400)

Cotton fabric is printed with a printing paste of the following composition:

- 4 parts of the complex leuco compound for copper phthalocyanine as described in Example 1 above
- 10 parts of urea
- 10 parts of ethylene glycol monoethyl ether
- 50 parts of starch-tragacanth paste (10%)
- 10 parts of sodium sulfite
- 16 parts of water

100

The color is then developed by aging the printed goods for thirty minutes in a cottage steamer. The aged prints are rinsed in water, then soaped, again rinsed in water and finally dried.

The prints obtained are of a deep blue shade. They are extremely fast to light and to crocking, and they exhibit good fastness to wet treatments, even in the presence of bleaching agents such as sodium hypochlorite.

It will be understood that the details of the above examples may be varied within considerable limits. Thus, in lieu of ethylene glycol-monoethyl ether in the above examples, the corresponding monoethyl or monobutyl ether may be employed, as well as other common solvents, for instance methanol or ethanol.

Numerous other variations and modifications will be readily apparent to those skilled in the art.

We claim as our invention:

1. A leuco-phthalocyanine compound of the formula

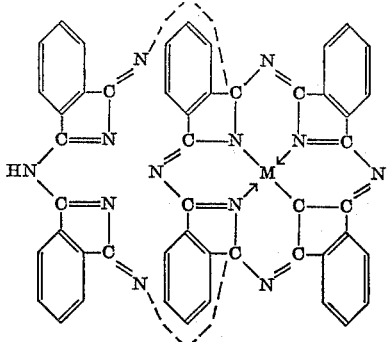

wherein M represents a metal of the group consisting of nickel and copper, said compound being characterized by being soluble in ethylene-glycol-monoethyl ether, and by yielding upon reduction ammonia, phthalonitrile and the corresponding metal phthalocyanine.

2. A leuco-phthalocyanine compound of the formula

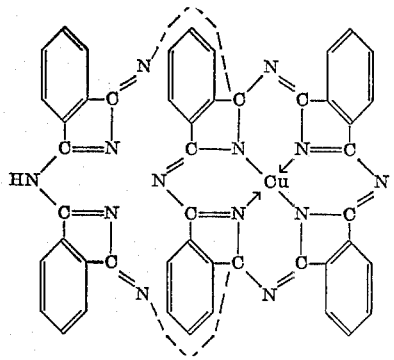

said compound being characterized by being soluble in ethylene-glycol-monoethyl ether and by yielding ammonia, phthalonitrile and copper phthalocyanine when a solution thereof in said solvent is treated with ascorbic acid.

3. A process for producing an intermediate complex compound adapted to yield a phthalocyanine pigment upon being treated with reducing agents, which comprises reacting, in an alcoholic solvent, at a temperature of 60° to 90° C. and in the presence of a catalyst selected from the group consisting of urea, biuret, guanidine and methyl-glucamine, a phthalonitrile, ammonia and a salt selected from the group consisting of nickel salts and cupric salts which are capable of forming ammine complexes with ammonia, then removing any residual insoluble material and drowning the clear reaction mass in water.

4. A process for producing an intermediate complex compound adapted to yield copper phthalocyanine upon being treated with reducing agents, which comprises reacting, at a temperature of 60° to 90° C., phthalonitrile, cupric chloride and ammonia in an alcoholic solvent containing a catalyst of the group consisting of urea, biuret, guanidine and methyl-glucamine, and recovering the reaction product by diluting the liquid portion of the reaction mass with water.

References Cited in the file of this patent

UNITED STATES PATENTS

| | | |
|---|---|---|
| 2,302,612 | Lacey | Nov. 17, 1942 |
| 2,413,191 | Palmer | Dec. 24, 1946 |
| 2,683,643 | Baumann et al. | July 13, 1954 |

FOREIGN PATENTS

| | | |
|---|---|---|
| 497,511 | Belgium | Dec. 1, 1950 |